(12) United States Patent
Yamazaki (10) Patent No.: US 8,831,811 B2
(45) Date of Patent: Sep. 9, 2014

(54) CONTROL UNIT FOR HYBRID VEHICLE

(75) Inventor: Yuichiro Yamazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 153 days.

(21) Appl. No.: 13/634,842

(22) PCT Filed: Mar. 31, 2011

(86) PCT No.: PCT/JP2011/058274
§ 371 (c)(1),
(2), (4) Date: Sep. 13, 2012

(87) PCT Pub. No.: WO2011/125865
PCT Pub. Date: Oct. 13, 2011

(65) Prior Publication Data
US 2013/0018540 A1    Jan. 17, 2013

(30) Foreign Application Priority Data
Apr. 5, 2010   (JP) .................. 2010-086848

(51) Int. Cl.
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC ............................. 701/22; 180/65; 903/930

(58) Field of Classification Search
USPC .......... 701/22, 71, 69, 54; 180/65.245, 65.21, 180/65.285, 233, 65.28, 65.275, 65.26, 180/65.1, 165; 903/930, 903, 905
See application file for complete search history.

(56) References Cited

U.S. PATENT DOCUMENTS

| 6,223,106 B1 * | 4/2001 | Yano et al. ................... 701/22 |
| 6,549,840 B1 * | 4/2003 | Mikami et al. ................. 701/69 |
| 6,629,027 B2 * | 9/2003 | Yamaguchi et al. ........... 701/22 |
| 6,739,418 B2 * | 5/2004 | Ogata et al. ............. 180/65.245 |
| 6,879,888 B2 * | 4/2005 | Ochiai et al. .................... 701/22 |
| 7,028,796 B2 * | 4/2006 | Kim ........................ 180/65.225 |
| 7,034,482 B2 * | 4/2006 | Komiyama et al. ........... 318/376 |

(Continued)

FOREIGN PATENT DOCUMENTS

| EP | 2557008 A1 * | 2/2013 |
| JP | 10-191510 | 7/1998 |

(Continued)

*Primary Examiner* — Thomas Black
*Assistant Examiner* — Robert Payne
(74) *Attorney, Agent, or Firm* — Westerman, Hattori, Daniels & Adrian, LLP (57) ABSTRACT

A control unit for a series hybrid vehicle includes a basic required output calculator for calculating a basic required output for driving the vehicle based on a vehicle speed and an accelerator pedal opening, a gradient calculator for calculating a rising gradient of a road surface on which the vehicle runs, a correction output calculator for calculating a correction output which is added to the basic required torque based on the rising gradient, and a target output calculator for calculating, when a required output which results from adding the correction output to the basic required output is larger than a predetermined value, based on the required output, a battery target electric power by which the battery is required to output part of the required output and an engine target output by which the engine is required to output the remaining of the required output.

10 Claims, 11 Drawing Sheets

(56) References Cited

U.S. PATENT DOCUMENTS

| | | | |
|---|---|---|---|
| 7,216,729 B2* | 5/2007 | Syed et al. | 180/65.28 |
| 7,240,748 B2* | 7/2007 | Kira et al. | 180/65.25 |
| 7,296,644 B2* | 11/2007 | Teraoka | 180/65.25 |
| 7,395,893 B2* | 7/2008 | Porter | 180/243 |
| 7,431,111 B2* | 10/2008 | Nada | 180/65.28 |
| 7,464,780 B2* | 12/2008 | Masterson et al. | 180/65.31 |
| 7,467,678 B2* | 12/2008 | Tanaka et al. | 180/65.265 |
| 7,525,279 B2* | 4/2009 | Breen | 320/104 |
| 7,532,961 B2* | 5/2009 | Hoshiba et al. | 701/22 |
| 7,533,743 B2* | 5/2009 | Kitano et al. | 180/65.285 |
| 7,533,746 B2* | 5/2009 | Yamaguchi | 180/65.29 |
| 7,624,568 B2* | 12/2009 | Ando et al. | 60/277 |
| 7,857,082 B2* | 12/2010 | Gray, Jr. | 180/65.28 |
| 7,869,911 B2* | 1/2011 | Yamaguchi | 701/22 |
| 7,997,363 B2* | 8/2011 | Mori et al. | 180/65.265 |
| 8,335,602 B2* | 12/2012 | Fauvel et al. | 701/22 |
| 8,396,618 B2* | 3/2013 | Cikanek et al. | 701/22 |
| 8,452,504 B2* | 5/2013 | Dickinson et al. | 701/69 |
| 8,489,265 B2* | 7/2013 | Sah et al. | 701/22 |
| 8,577,526 B2* | 11/2013 | Jinno et al. | 701/22 |
| 8,596,390 B2* | 12/2013 | Soliman et al. | 180/65.21 |
| 8,649,924 B2* | 2/2014 | Imaseki | 701/22 |
| 2009/0071736 A1* | 3/2009 | Mori et al. | 180/65.285 |

FOREIGN PATENT DOCUMENTS

| | | |
|---|---|---|
| JP | 2001-171377 A | 6/2001 |
| JP | 3442950 B2 | 6/2003 |
| JP | 2008-087719 A | 4/2008 |
| WO | WO 01/83967 A1 | 11/2001 |

* cited by examiner

CONTROL UNIT FOR HYBRID VEHICLE

CROSS-REFERENCE TO RELATED APPLICATIONS

This application is a National Stage entry of International Application No. PCT/JP2011/058274, filed Mar. 31, 2011, which claims priority to Japanese Patent Application No. 2010-086848 filed Apr. 5, 2010, the disclosure of the prior application are incorporated in their entirety by reference.

TECHNICAL FIELD

The present invention relates to a control unit for a hybrid vehicle which can improve both of driveability supported by an increased driving force of a drive source and low fuel consumption.

BACKGROUND ART

A motor control unit for an electric vehicle described in Patent Literature 1 performs an incremental correction to a relationship between an output torque of a drive motor and an accelerator pedal operation amount as the gradient of a road increases. For example, a target torque of the drive motor increases as the gradient of a slope increases, that is, as the slope gets steeper, so that the driver does not feel a feeling of insufficient driving force when the gradient of the road increases, thereby increasing the drive feeling.

PRIOR ART LITERATURE

Patent Literature

Patent Literature 1: JP-3442950-B

SUMMARY OF THE INVENTION

Figure 11:
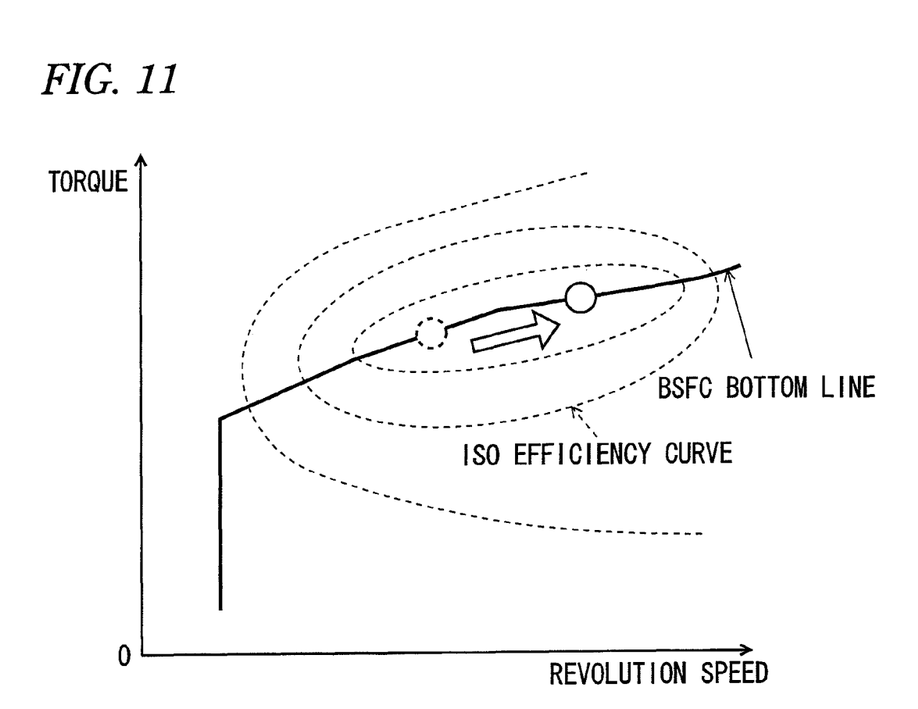
FIG. 11 is a graph of properties in relation to the thermal efficiency of the engine.

Patent Literature 1 discloses a motor control unit for an electric vehicle which includes only a drive motor as a drive source. Here, when this motor control unit is applied to a series HEV (Hybrid Electric Vehicle), the motor control unit can select at least either of a battery and an engine as a drive source to realize the incremental correction of the output torque. The series HEV includes an electric motor, an engine and a generator, and is driven by the electric motor which is driven by a battery as a power supply. The engine is used only for generation of electric power, and electric power generated in the generator by the output of the engine is supplied to the electric motor or is stored in the battery. The engine is operated on a line (a BSFC (Brake Specific Fuel Consumption) bottom line) which connects operation points where a best fuel consumption rate is obtained, as shown by a thick solid line in FIG. 11.

In the series HEV, for example, when the torque for the incremental correction is covered only by generation of electric power by the output of the engine, the revolution speed of the engine should be increased, and hence, the operation noise of the engine is increased. Thus, the driver may feel a feeling of strangeness from the operation noise of the engine which is increased despite the constant operation of the accelerator pedal. On the other hand, when the torque for the incremental correction is covered only by the battery, the battery may be discharged excessively.

One aspect of the present invention provides a control unit for a hybrid vehicle, the hybrid vehicle including:
an engine;
a generator which generates electric power by being driven by the engine;
a battery which supplies electric power to an electric motor; and
the electric motor which is connected to a drive shaft of the hybrid vehicle and which is driven by means of electric power supplied from at least either of the battery and the generator,
wherein the control unit includes:
a basic required output calculator for calculating a basic required output for driving the hybrid vehicle based on a driving speed of the hybrid vehicle and an accelerator pedal opening which corresponds to an accelerator pedal operation in the hybrid vehicle;
a gradient calculator for calculating a rising gradient of a road surface on which the hybrid vehicle runs;
a correction output calculator for calculating a correction output which is added to the basic required torque based on the rising gradient; and
a target output calculator for calculating, when a required output which results from adding the correction output to the basic required output is larger than a predetermined value, based on the required output, a battery target electric power by which the battery is required to output part of the required output and an engine target output by which the engine is required to output the remaining of the required output.

According to a first aspect of the invention, even when the required output is increased as when the vehicle is climbing up along a rising slope, both of the driveability supported by the increased driving force and low fuel consumption can be improved, without causing the driver to feel a feeling of strangeness.

MODE FOR CARRYING OUT THE INVENTION

An embodiment of the invention will be described by reference to the drawings. In the embodiment, a control unit according to the invention is installed in a vehicle like a series HEV (Hybrid Electric Vehicle). The series HEV includes an electric motor, an engine and a generator, and is driven by the electric motor which is driven by a battery as a power supply. The engine is used only for generation of electric power, and electric power generated in the generator by the output of the engine is supplied to the electric motor or is stored in the battery.

The series HEV is driven in an "EV driving" or a "series driving." In the EV driving, the HEV is driven by a driving force of the electric motor which is driven by electric power supplied from the battery. As this occurs, the engine is not driven. In addition, in the "series driving," the HEV is driven by the driving force of the electric motor which is driven by electric power supplied from both the battery and the generator or electric power supplied from only the generator. As this occurs, the engine is driven only to generate electric power in the generator. The engine is driven on a line which connects operation points where a best fuel consumption rate is provided (a BSFC (Brake Specific Fuel Consumption) bottom line) shown in FIG. 11.

Figure 1:
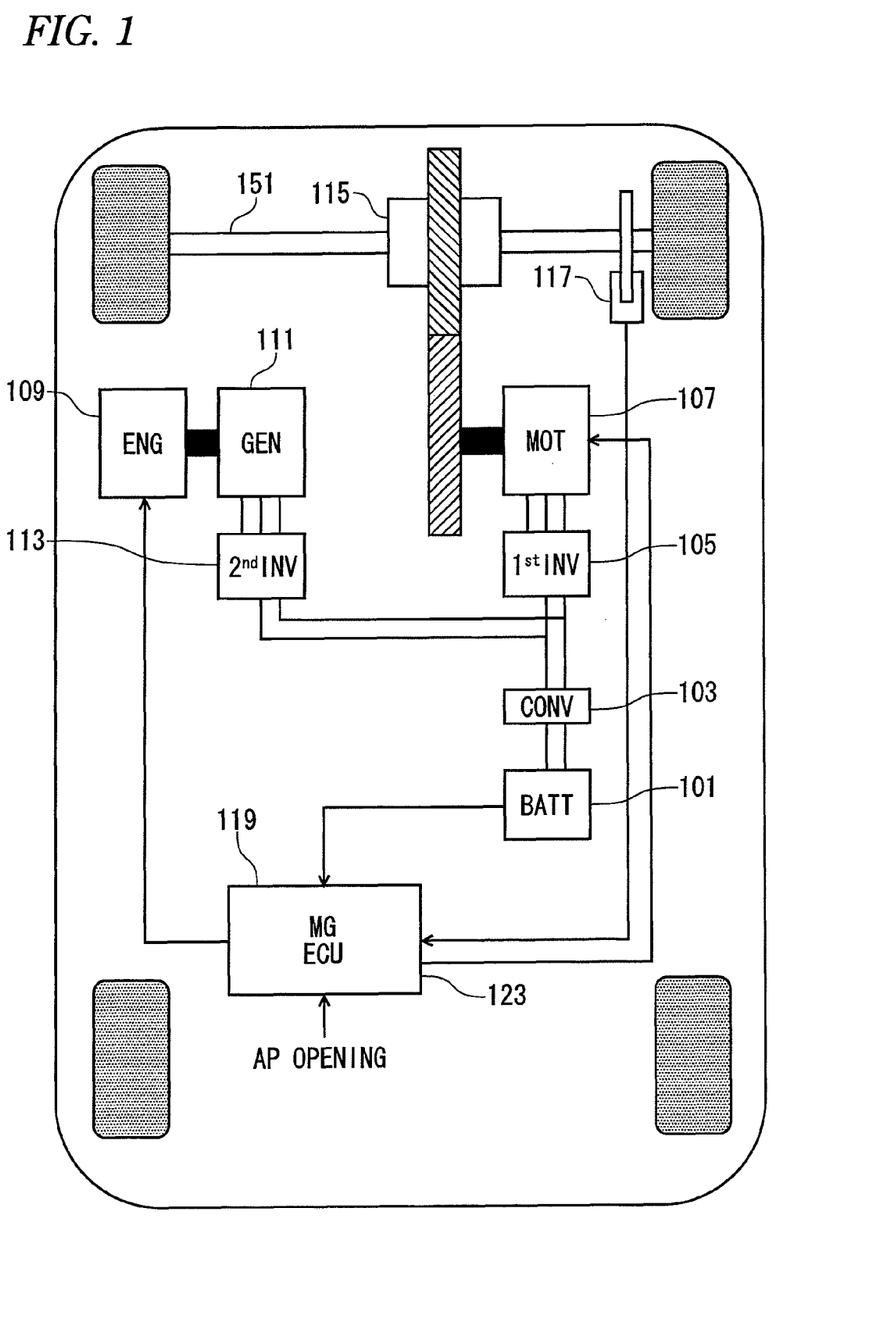
FIG. 1 shows an internal configuration of a series HEV.

FIG. 1 shows an internal configuration of the series HEV. As shown in FIG. 1, the series HEV includes a battery 101, a converter (CONV) 103, a first inverter ($1^{st}$ INV) 105, an electric motor (Mot) 107, an engine (ENG) 109, a generator (GEN) 111, a second inverter ($2^{nd}$ INV) 113, a gearbox (hereinafter, referred to simply as a "gear") 115, a vehicle speed sensor 117, and a management ECU (MG ECU) 119.

The battery 101 has a plurality of battery cells which are connected in series and supplies such a high voltage of 100 to 200 V, for example. The battery cells are lithium ion batteries or nickel-metal hydride batteries. The converter 103 increases or decreases a DC voltage of the battery 101 in the form of direct current without any conversion. The first inverter 105 converts a DC voltage into an AC voltage to supply a three-phase current to the electric motor 107. In addition, the first inverter 105 converts an AC voltage which is inputted when the electric motor 107 implements regeneration into a DC voltage to charge the battery 101.

The electric motor 107 generates electric power by which the vehicle is driven. Torque generated in the electric motor 107 is transmitted to a drive shaft 151 via the gear 115. In addition, a rotor of the electric motor 107 is connected directly to the gear 115. Additionally, the electric motor 107 functions as a generator during regenerative braking, and electric power generated in the electric motor 107 is stored in the battery 101. The engine 109 is used to drive the generator 111 when the HEV is driven in the series driving. The engine 109 is connected directly to a rotor of the generator 111.

The generator 111 generates electric power by the output of the engine 109. The electric power generated by the generator 111 is stored in the battery 101 or is supplied to the electric motor 107. The second inverter 113 converts an AC voltage generated in the generator 111 into a DC voltage. The electric power converted by the second inverter 113 is stored in the battery 101 or is supplied to the electric motor 107 by way of the first inverter 105.

The gear 115 is a fixed gear of one gear which corresponds to a fifth speed gear. Consequently, the gear 115 converts the driving force from the electric motor 107 into revolution speed and torque at a specific gear ratio to transmit it to the drive shaft 151. The vehicle speed sensor 117 detects a driving speed (a vehicle speed VP) of the HEV. A signal indicating the vehicle speed VP detected by the vehicle speed sensor 117 is sent to the management ECU 119.

The management ECU 119 obtains a state-of-charge (SOC) which indicates the state of the battery 101, calculates an accelerator pedal opening (AP opening) which corresponds to an accelerator pedal operation performed by the driver of the HEV and a basic required output based on the vehicle speed VP, and controls variously the engine 109 and the electric motor 107. The details of the management ECU 119 will be described later.

Figure 2:
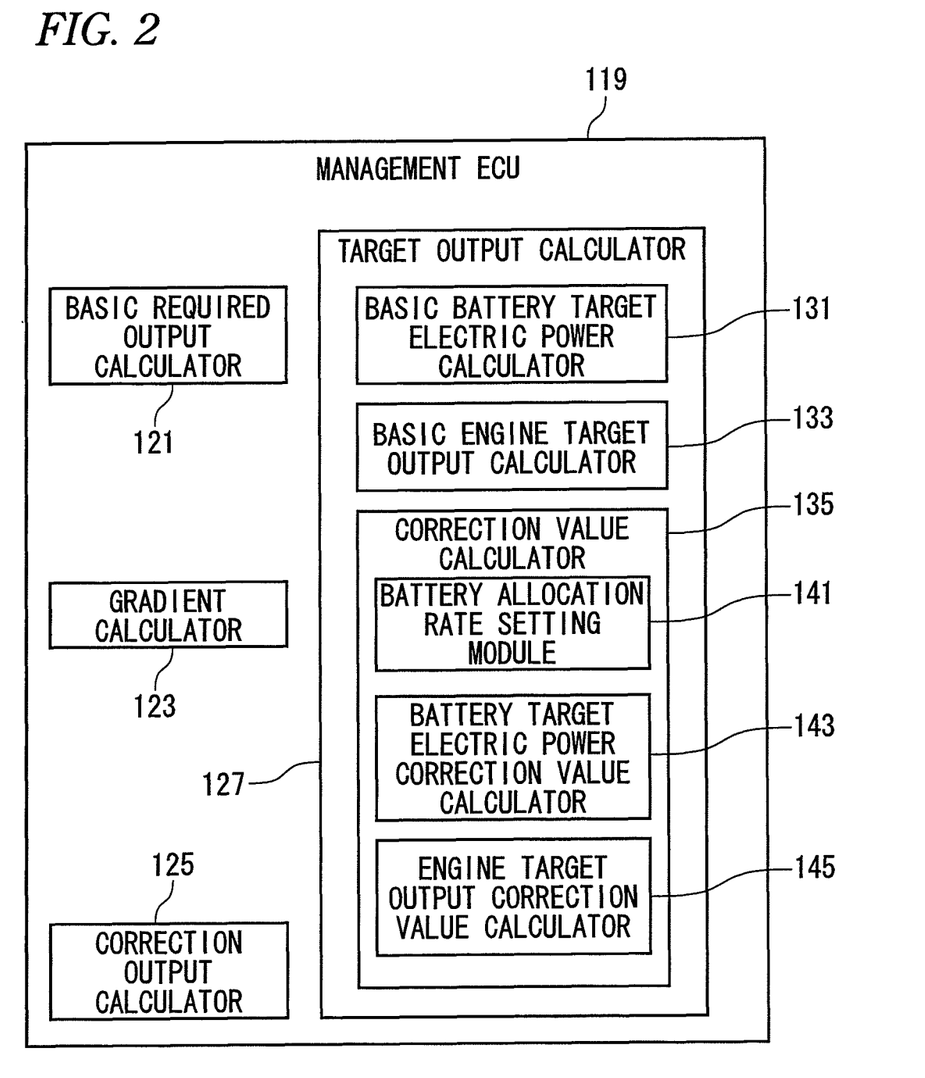
FIG. 2 shows an internal configuration of a management ECU 119.

FIG. 2 shows an internal configuration of the management ECU 119. As shown in FIG. 2, the management ECU 119 has a basic required output calculator 121, a gradient calculator 123, a correction output calculator 125 and a target output calculator 127. In addition, the target output calculator 127 has a basic battery target electric power calculator 131, a basic engine target output calculator 133 and a correction value calculator 135. Additionally, the correction value calculator 135 has a battery allocation rate setting module 141, a battery target electric power correction value calculator 143 and an engine target output correction value calculator 145.

Figure 3:
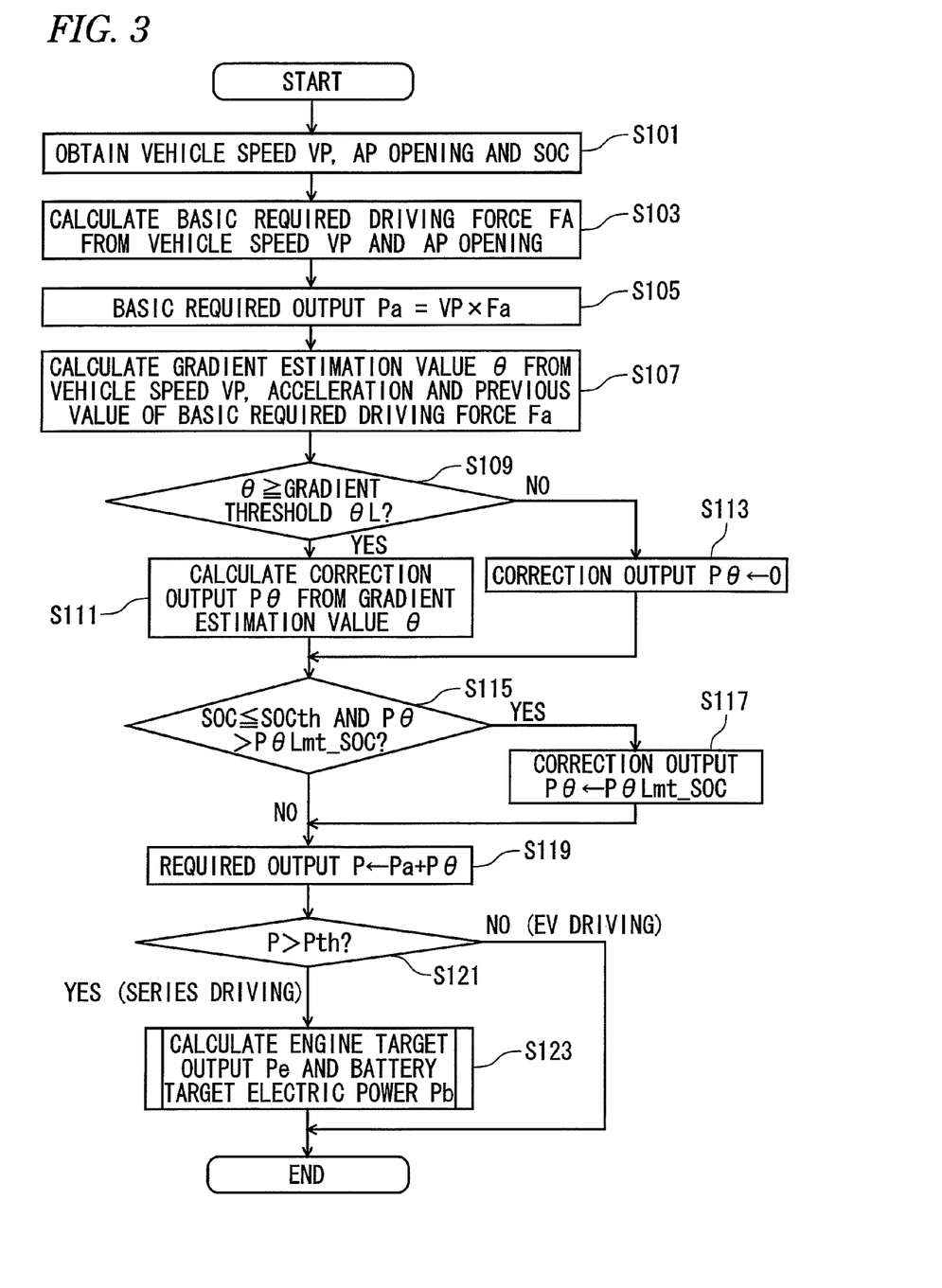
FIG. 3 shows the operation of the management ECU 119.
Figure 4:
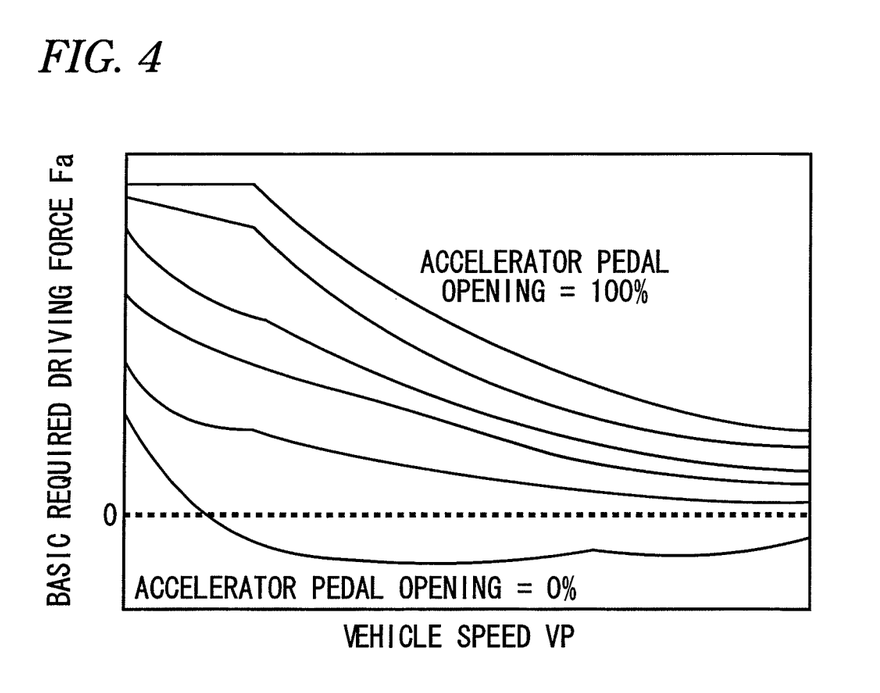
FIG. 4 is a graph of a basic required driving force Fa relative to vehicle speed VP and AP opening.

FIG. 3 shows the operation of the management ECU 119. As shown in FIG. 3, the management ECU 119 obtains a vehicle speed VP, an AP opening and an SOC of the battery 101 (step S101). Next, the basic required output calculator 121 that the management ECU 119 possesses calculates a basic required driving force Fa from the vehicle speed VP and the AP opening by reference to a graph shown in FIG. 4 (step S103). FIG. 4 is a graph of the basic required driving force Fa relative to the vehicle speed VP and the AP opening. The basic required output calculator 121 may obtain the basic required driving force Fa by reference to a table in which the vehicle speed VP, the AP opening and the basic required driving force Fa are shown in relation to each other. Next, the basic required output calculator 121 multiplies the vehicle speed VP by the basic required driving force Fa to thereby obtain a basic required output Pa (step S105).

Next, the gradient calculator 123 calculates an acceleration by differentiating the vehicle speed VP and calculates a gradient estimation value θ from the vehicle speed VP, the acceleration and the previous value of the basic required driving force Fa using an equation (1) shown below (step S107). The gradient estimation value θ denotes a rising gradient.

$$\text{Gradient estimation value } \theta = \{F - (Ra + Rr + Rc)\}/(W \times g) \quad (1)$$

where,
F: Previous value of basic required driving force Fa;
g: Gravity acceleration;
Air resistance Ra=λ×S×VP2 (λ: Air resistance factor; S: Frontal projected area);
Rolling resistance Rr=W×μ (W: Vehicle weight; μ: Rolling resistance factor);
Acceleration resistance Rc=α×W (α: Acceleration)
(When θ≅0, sin θ≅θ)
A gradient sensor may be used in place of the gradient calculator 123.

Figure 5:
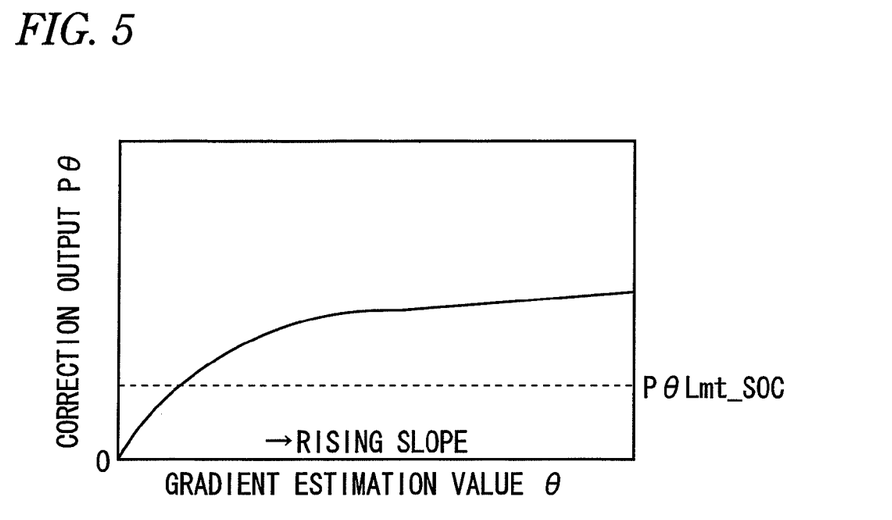
FIG. 5 is a graph of a correction output PB relative to a gradient estimation value $\theta$ and a threshold P$\theta$Lmt_SOC.

The correction output calculator 125 determines whether or not the gradient estimation value θ calculated in step S107 is equal to or larger than a gradient threshold θL (step S109). If the gradient estimation value θ is equal to or larger than the gradient estimation value θL (θ≧θL), the flow then proceeds to step S111, whereas if the gradient estimation value θ is smaller than the gradient estimation value θL (θ<θL), the flow then proceeds to step S113. In step S111, the correction output calculator 125 calculates a correction output Pθ from the gradient estimation value θ by reference to a graph shown in FIG. 5. FIG. 5 is the graph which indicates the correction output Pθ for the gradient estimation value θ and a threshold PθLmt_SOC. The threshold PθLmt_SOC is an output which somehow prevents the driver from feeling a feeling of strangeness even when only the engine 109 covers the correction output Pθ and is 5 [kW], for example. On the other hand, in step S113, the correction output calculator 125 sets the correction output Pθ to 0. This is because the accuracy of gradient estimation is low when the gradient estimation value θ is a very small value such as one degree and frequent controls by driving force correction is suppressed.

After the operations in step S111 and step S113 have been implemented, the correction output calculator 125 determines whether or not the SOC of the battery 101 is equal to or smaller than the threshold SOCth and whether or not the correction output Pθ is larger than the threshold PθLmt_SOC (step S115). If these two conditions are met, the flow proceeds to step S117, whereas if not, the flow proceeds to step S119. In step S117, the correction output calculator 125 limits the correction output Pθ calculated in step S111 to the threshold PθLmt_SOC (Pθ←PθLmt_SOC) and thereafter, the flow proceeds to step S119.

In step S119, the target output calculator 127 obtains a required output P by adding the correction output Pθ to the basic required output Pa calculated in step S105. Next, the target output calculator 127 determines whether or not the required output is larger than a threshold Pth (step S121). If it is determined in step S121 that the required output P is larger than the threshold Pth (P>Pth), the target output calculator 127 determines that the HEY is being driven in the series driving, and the flow then proceeds to step S123. On the other hand, If it is determined in step S121 that the required output P is equal to or smaller than the threshold Pth (P≤Pth), the target output calculator 127 determines that the HEY is being driven in the EV driving, and the flow ends.

Figure 6:
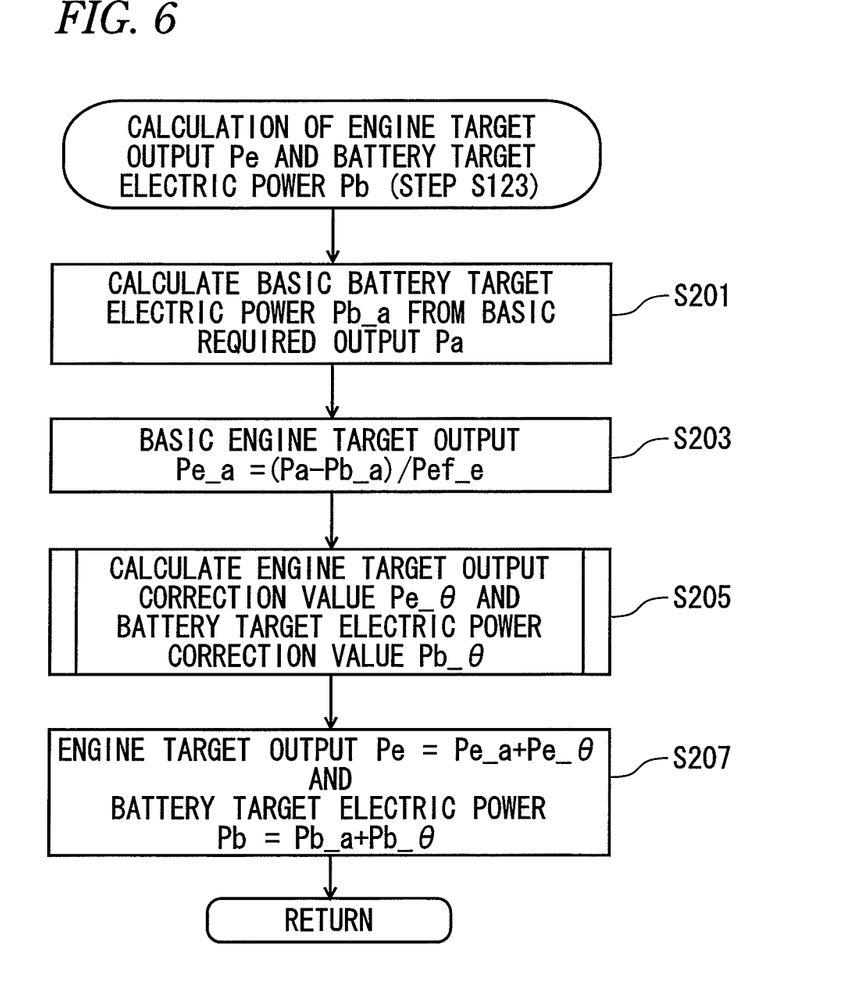
FIG. 6 shows an operation of step S123 shown in FIG. 3.

In step S123, the target output calculator 127 obtains an engine target output Pe and a battery target electric power Pb. FIG. 6 shows the operation of step S123 shown in FIG. 3. As shown in FIG. 6, when it is determined that the HEV is being driven in the series driving, the basic battery target electric power calculator 131 that the target output calculator 127 possesses of the management ECU 119 obtains a basic battery target electric power Pb_a from the basic required output Pa obtained in step S105 shown in FIG. 3 by reference to a graph shown in FIG. 7 (step S201).

Figure 7:
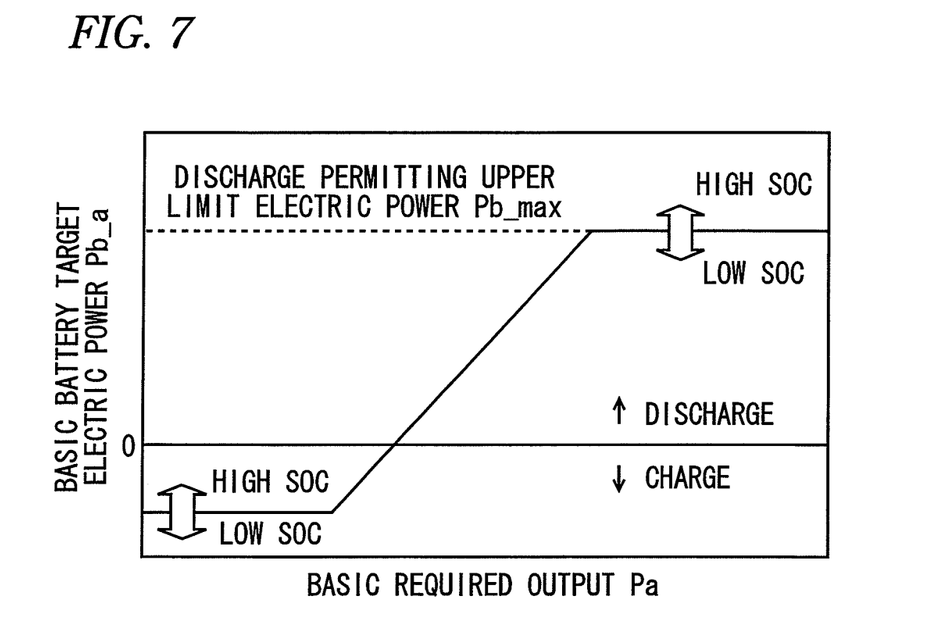
FIG. 7 is a graph of a basic battery target electric power Pb_a relative to a basic required output Pa and a discharge permitting upper limit electric power Pb_max.

FIG. 7 is a graph of the basic battery target electric power Pb_a relative to the basic required output Pa and a discharge permitting upper limit electric power Pb_max. As shown in FIG. 7, the basic required output Pb_a when the basic required output Pa is high is set to the discharge permitting upper limit electric power Pb_max, whereas the basic required output Pb_a when the basic required output Pa is low is set to a predetermined value (a negative value). The predetermined value of the basic battery target electric power Pb_a when the discharge permitting upper limit electric power Pb_max and the basic required output Pa are low varies in accordance with the SOC of the battery 101.

Next, the basic engine target output calculator 133 calculates a basic engine target output Pe_a from the basic battery target electric power Pb_a and an efficiency Pef_e using an equation (2) shown below (step S203). The efficiency Pef_e is a value obtained by multiplying an electric transmission efficiency from the output shaft of the engine 109 to the drive shaft 151 by a mechanical efficiency.

$$\text{Basic engine target output } Pe\_a = (Pa - Pb\_a)/Pef\_e \quad (2)$$

Next, the correction value calculator 135 obtains an engine target output correction value Pe_θ and a battery target electric power correction value Pb_θ (step S205). The details of an operation of step S205 will be described later. Next, the target output calculator 127 calculates an engine target output Pe by adding the engine target output correction value Pe_θ to the basic engine target output Pe_a and calculates a battery target electric power Pb by adding the battery target electric power correction value Pb_θ to the basic battery target electric power Pb_a calculated in step S201 (step S207). The management ECU 119 controls the engine 109 and the electric motor 107 based on the engine target output Pe and the battery target electric power Pb which are calculated in this way.

Figure 8:
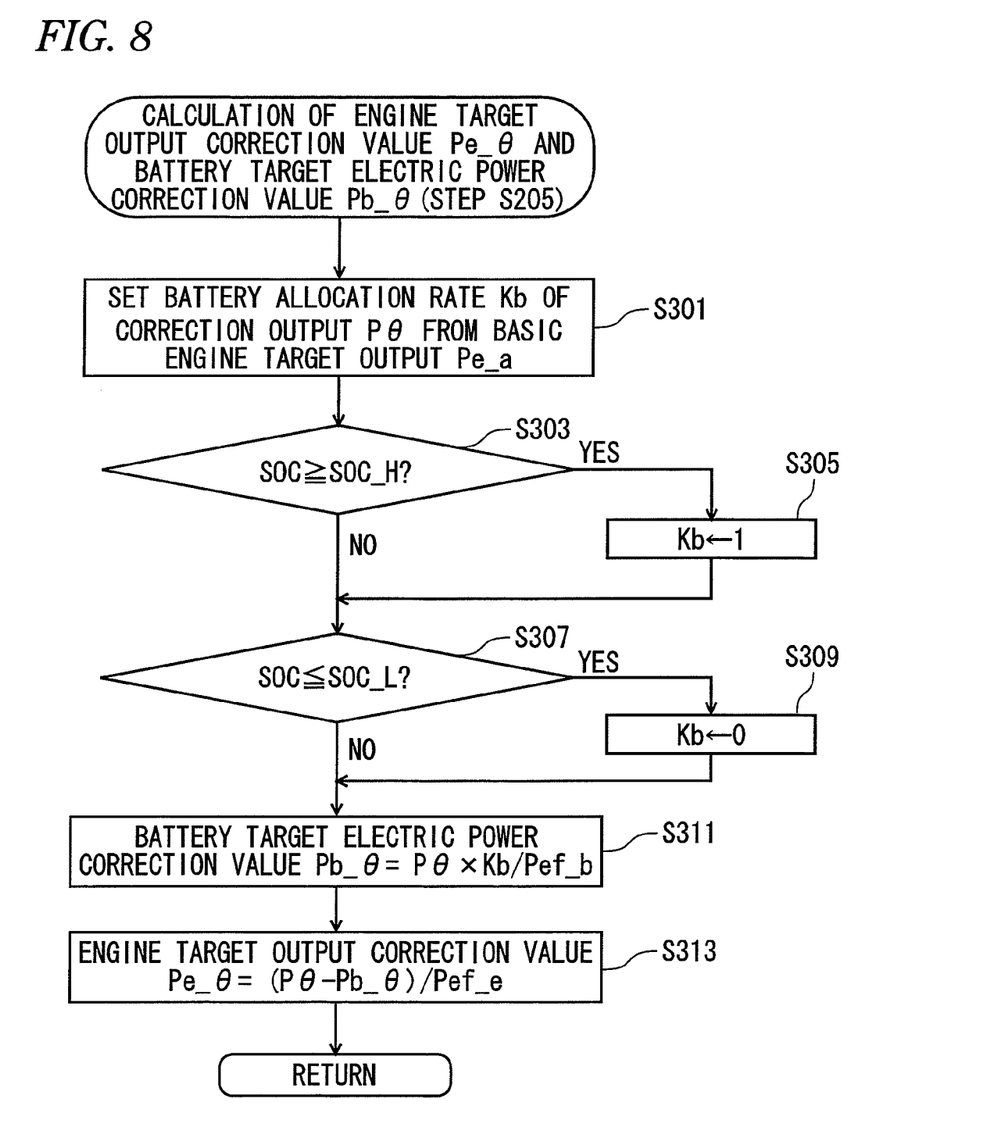
FIG. 8 shows an operation of step S205 shown in FIG. 6.
Figure 9:
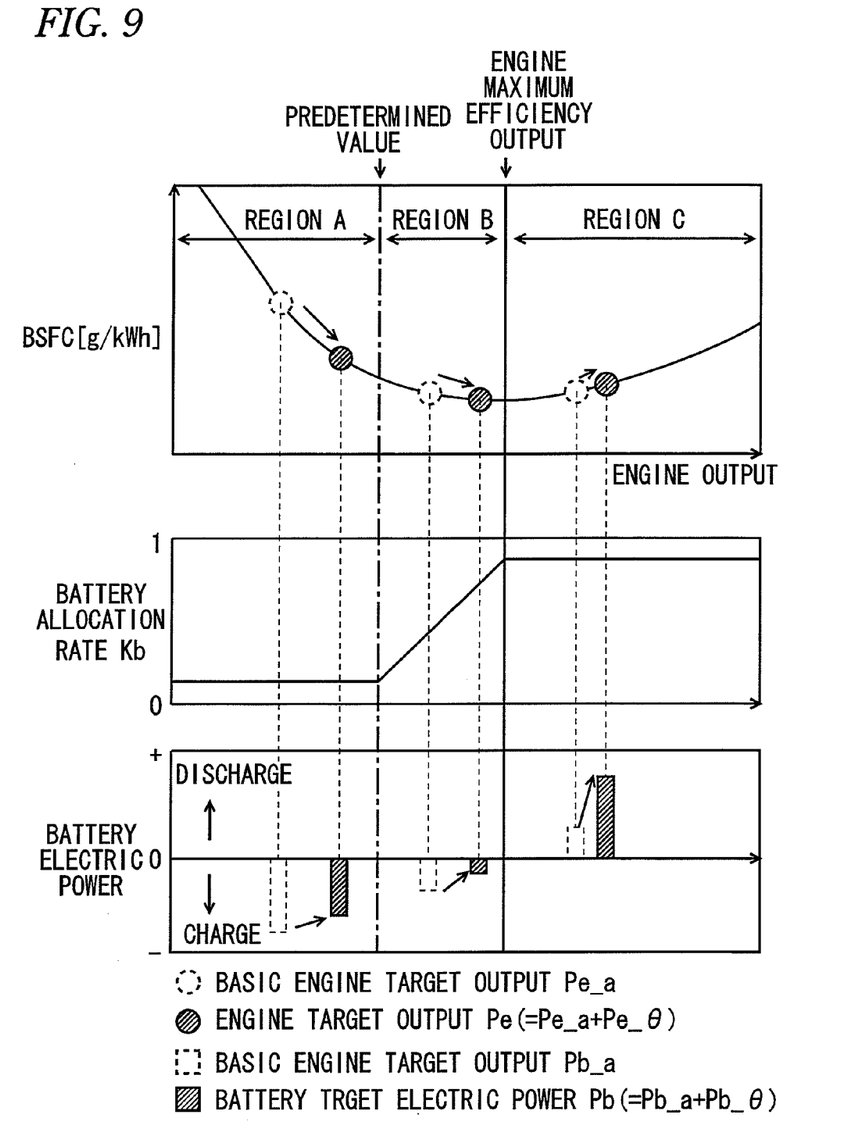
FIG. 9 shows a relationship between an engine output (the output of an engine 109) and BSFC and examples of changes in operation point of the engine 109 and charging and discharging regions A to C of a battery 101 which will occur before and after a correction performed in step S207 shown in FIG. 6.

FIG. 8 shows the operation of step S205 shown in FIG. 6. As shown in FIG. 8, the battery allocation rate setting module 141 that the correction value calculator 135 of the management ECU 119 possesses sets a battery allocation rate Kb of the correction output Pθ from the basic engine target output Pe_a calculated in step S203 shown in FIG. 6 by reference to a graph shown in FIG. 9 (step S301). FIG. 9 shows a relationship between the engine output (the output of the engine 109) and BSFC and examples of changes in operation point of the engine 109 and charging and discharging regions A to C of the battery which will occur before and after a correction performed in step S207 shown in FIG. 6. In FIG. 9, three regions A to C are set in accordance with magnitudes of outputs from the engine 109. Namely, a region equal to or larger than an output by which the engine 109 operates with its maximum efficiency (a maximum efficiency output) is a "region C," a region from a predetermined value which is lower than the maximum efficiency output and larger to smaller than the maximum efficiency output is a "region B," and a region smaller than the predetermined value is a "region A."

The region A is a region where a load is lower than a load resulting during the maximum efficiency output and the BSFC increases as the engine output increases. Consequently, the battery allocation rate Kb is set small in the region A. On the other hand, the region C is a region where a load is higher than the load resulting during the maximum efficiency output and the BSFC deteriorates as the engine output increases. Consequently, the battery allocation rate Kb is set large in the region C. Additionally, in the region B, the BSFC increases as the engine output increases from the predetermined value towards the maximum efficiency output and the battery allocation rate Kb is set so as to connect the battery allocation rate Kb in the region A and the battery allocation ate Kb in the region C. The battery allocation rate Kb is a value which is 0 or larger and 1 or smaller.

After the battery allocation rate Kb is set in step S301, the battery allocation rate setting module 141 determines whether or not the SOC of the battery 101 is equal to or larger than an output upper limit SOC (SOC_H) (step S303). If the SOC of the battery 101 is determined to be equal to or larger than the output upper limit SOC (SOC≥SOC_H), the battery allocation rate setting module 141 resets the battery allocation rate Kb to 1 (step S305), whereas if the SOC of the battery 101 is determined to be smaller than the output upper limit SOC (SOC<SOC_H), the flow proceeds to step S307). In step S307, the battery allocation rate setting module 141 determines whether or not the SOC of the battery 101 is equal to or smaller than an output lower limit SOC (SOC_L). If the SOC of the battery 101 is determined to be equal to or smaller than the output lower limit SOC (SOC≤SOC_L), the battery allocation rate setting module 141 resets the battery allocation rate Kb to 0 (step S309), whereas if the SOC of the battery 101 is smaller than the output lower limit SOC (SOC>SOC_L), the flow proceeds to step S311. The upper limit SOC and the lower limit SOC denote respectively an upper end value and a lower end value of a predetermined range of SOC (an intermediate region) where the charge and discharge of the battery 101 are repeated.

In step S311, the battery target electric power correction value calculator 143 calculates a battery target electric power correction value Pb_θ from the correction output Pθ, the battery allocation rate Kb and the efficiency Pef_b using an equation (3) shown below. The efficiency Pef_e is a value obtained by multiplying the electric transmission efficiency from the battery 101 to the drive shaft 151 by way of the electric motor 107 by the mechanical efficiency.

Battery target electric power correction value
$$Pb\_\theta = P\theta \times Kb/Pef\_b \quad (3)$$

Next, the engine target output correction value calculator 145 calculates an engine target electric power correction value Pe_θ from the correction output Pθ, the battery target electric power correction value Pb_θ and the efficiency Pef_e using an equation (4) shown below (step S313). The efficiency Pef_e is a value obtained by multiplying the electric transmission efficiency from the output shaft of the engine 109 to the drive shaft 151 by the mechanical efficiency.

Engine target output correction value $Pe\_\theta = (P\theta - Pb\_\theta)/Pef\_e$ (4)

An engine target output Pe is obtained by adding the engine target output correction value Pe_θ obtained above to the basic engine target output Pe_a calculated in step S203 shown in FIG. 6 (Engine target output Pe=Basic engine target output Pe_a+Engine target output correction value Pe_θ). Similarly, a battery target electric power Pb is obtained by adding the battery target electric power correction value Pb_θ obtained above to the basic battery target electric power Pb_a calculated in step S201 shown in FIG. 6 (Battery target electric power Pb=Basic battery target electric power Pb_a+Battery target electric power correction value Pb_θ).

In addition, when the battery allocation rate Kb is set small, since the battery target electric power correction value Pb_θ becomes small, the engine target output correction value Pe_θ becomes large accordingly. As this occurs, when implementing a correction to increase the required output P, the management ECU 119 controls so that the regenerative electric power of the battery 101 is decreased while the output of the engine 109 is increased as shown in the region A in FIG. 9, for example. Since the revolution speed of the engine 109 is low in the region A, even when the revolution speed of the engine 109 is increased largely so as to increase the output thereof, the driver will not feel a feeling of strangeness from the operation noise of the engine 109. Consequently, the engine 109 covers the increased driving force more than the battery 101.

On the other hand, when the battery allocation rate Kb is set large, since the battery target electric power correction value Pb_v becomes large, the engine target output correction value Pe_θ is reduced accordingly. As this occurs, when implementing the correction to increase the required output P, the management ECU 119 controls so that the output of the battery 101 exceeds the increased output of the engine 109 is increased as shown in the region C in FIG. 9, for example. Since the revolution speed of the engine 109 is high in the region C, when the revolution speed of the engine 109 is increased largely so as to increase the output thereof, the driver may feel a feeling of strangeness from the operation noise of the engine 109. Consequently, as long as the SOC of the battery 101 is equal to or smaller than the output lower limit SOC, the battery 101 covers the increased driving force more than the engine 109.

According to this embodiment, even when the required output P is corrected to be increased as when the vehicle is climbing up along a rising slope, the covering rates of the increased output by the battery 101 and the engine 109 are controlled according to the region to which the current output of the engine 109 belongs or the SOC of the battery 101. Consequently, both of the driveability supported by the increased driving force and the low fuel consumption can be improved, without causing the driver to feel a feeling of strangeness from the operation noise of the engine 109 and while preventing the excessive discharge of the battery 101. The driveability is improved by eliminating the insufficient driving force that will be felt by the driver as when the vehicle is climbing up along a rising slope. Additionally, the fuel consumption is improved by preventing an unnecessary excessive depression of the accelerator pedal by the driver.

Figure 10:
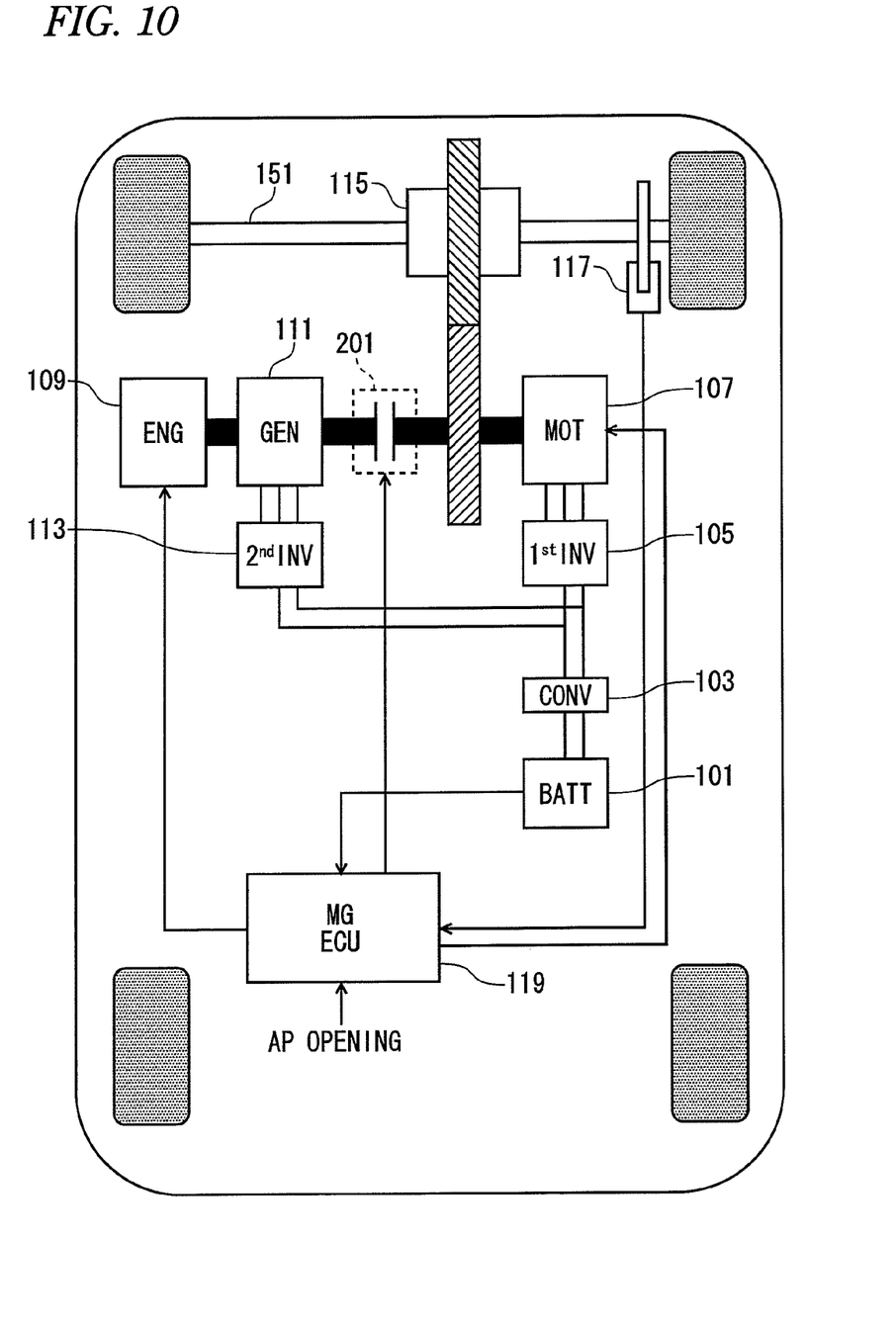
FIG. 10 shows an internal configuration of a series/parallel switchable HEV.

The control unit of this embodiment can be applied to a so-called series/parallel switchable HEV shown in FIG. 10 when the HEV is being driven in a series mode where a clutch 201 is released.

While the invention is exemplified with reference to the embodiment, the skilled person can alter or modify variously the embodiment without departing from the spirit and scope of the invention.

This patent application is based upon Japanese Patent Application (No. 2010-086848) filed on Apr. 5, 2010, the contents of which are incorporated herein by reference.

A first aspect of the invention provides a control unit for a hybrid vehicle, the hybrid vehicle including:
an engine (e.g., an engine 109 in embodiment);
a generator (e.g., a generator 111 in embodiment) which generates electric power by being driven by the engine;
a battery (e.g., a battery 101 in embodiment) which supplies electric power to an electric motor; and
the electric motor (e.g., an electric motor 107 in embodiment) which is connected to a drive shaft (e.g., a drive shaft 151 in embodiment) of the hybrid vehicle and which is driven by means of electric power supplied from at least either of the battery and the generator,
wherein the control unit includes:
a basic required output calculator (e.g., a basic required output calculator 121 in embodiment) for calculating a basic required output (e.g., a basic required output Pa in embodiment) for driving the hybrid vehicle based on a driving speed (e.g., a vehicle speed VP in embodiment) of the hybrid vehicle and an accelerator pedal opening (e.g., an AP opening in embodiment) which corresponds to an accelerator pedal operation in the hybrid vehicle;
a gradient calculator (e.g., a gradient calculator 123 in embodiment) for calculating a rising gradient of a road surface on which the hybrid vehicle runs;
a correction output calculator (e.g., a correction output calculator 125 in embodiment) for calculating a correction output (e.g., a correction output Pθ in embodiment) which is added to the basic required torque based on the rising gradient; and
a target output calculator (e.g., a target output calculator 127 in embodiment) for calculating, when a required output (e.g., a required output P in embodiment) which results from adding the correction output to the basic required output is larger than a predetermined value (e.g., a threshold Pth in embodiment), based on the required output, a battery target electric power (e.g., a battery target electric power Pb in embodiment) by which the battery is required to output part of the required output and an engine target output (e.g., an engine target output Pe in embodiment) by which the engine is required to output the remaining of the required output.

A second aspect of the invention provides the control unit, wherein the target output calculator has:
a basic battery target electric power calculator (e.g., a basic battery target electric power calculator 131 in embodiment) for calculating a basic battery target electric power (e.g., a basic battery target electric power Pb_a in embodiment) for the battery based on the basic required output;

a basic engine target output calculator (e.g., a basic engine target output calculator 133 in embodiment) for calculating a basic engine target output (e.g., a basic engine target output Pe_a in embodiment) for the engine; and a correction value calculator (e.g., a correction value calculator 135 in embodiment) for calculating a battery target electric power correction value (e.g., a battery target electric power correction value Pb_θ in embodiment) which is added to the basic battery target electric power and an engine target output correction value (e.g., an engine target output correction value Pe_θ in embodiment) which is added to the basic engine target output, wherein the battery target electric power is calculated by adding the battery target electric power correction value to the basic battery target electric power, and wherein the engine target output is calculated by adding the engine target output correction value to the basic engine target output.

A third aspect of the invention provides the control unit, wherein the correction value calculator has a covering rate setting module (e.g., a battery allocation rate setting module 141 in embodiment) for setting a covering rate of the correction output by the battery based on the basic engine target output, calculates the battery target electric power correction value based on the correction output and the covering rate, and calculates the engine target output correction value based on the correction output and the battery target electric power correction value.

A fourth aspect of the invention provides the control unit, wherein the engine is driven so as to trace a high efficient fuel consumption line (e.g., a BSFC bottom line in embodiment), and wherein the covering rate setting module sets the covering rate of the correction output by the battery so that the basic engine target output becomes smaller when the basic engine target output is smaller than a predetermined engine output which is smaller than a maximum efficiency output at which the engine operates with a maximum efficiency than when the basic engine target output is the maximum efficiency output or larger.

A fifth aspect of the invention provides the control unit, wherein the covering rate setting module sets the covering rate of the correction output by the battery so that the basic engine target output increases from the predetermined engine output towards the maximum efficiency output when the engine target output is equal to or larger than the predetermined engine output and smaller than the maximum efficiency output.

A sixth aspect of the invention provides the control unfit, further including:

a state-of-charge obtaining module (e.g., a management ECU 119 in embodiment) for obtaining a state-of-charge of the battery, wherein, when the state-of-charge is a predetermined value or smaller and the correction output is smaller than a predetermined correction output, the covering rate setting module sets the covering rate of the correction output by the battery so that the battery does not cover the correction output at all.

A seventh aspect of the invention provides the control unit, further including:

a state-of-charge obtaining module (e.g., a management ECU 119 in embodiment) for obtaining a state-of-charge of the battery, wherein, when the state-of-charge is a predetermined value or larger, the covering rate setting module sets the covering rate of the correction output by the battery so that the battery covers the correction output in whole.

An eighth aspect of the invention provides the control unit, further including:

a state-of-charge obtaining module (e.g., a management ECU 119 in embodiment) for obtaining a state-of-charge of the battery, wherein, when the state-of-charge is a predetermined value or smaller and the correction output is larger than a predetermined correction output, the correction output calculator limits the correction output to the predetermined correction output, and wherein the covering rate setting module sets the covering rate of the correction output by the battery so that the battery does not cover the correction output at all.

A ninth aspect of the invention provides the control unit, wherein, when the state-of-charge is a predetermined value or larger, the covering rate setting module sets the covering rate of the correction output by the battery so that the battery covers the correction output in whole.

According to the first through ninth aspects, even when the required output is increased as when the vehicle is climbing up along a rising slope, both of the driveability supported by the increased driving force and low fuel consumption can be improved, without causing the driver to feel a feeling of strangeness.

According to the fourth aspect, the battery is caused to cover the correction output more than the engine when the basic engine target output is equal to or larger than the maximum efficiency output, whereas the engine is caused to cover the correction output more than the battery when the basic engine target output is smaller than the predetermined engine output, thereby improving both of driveability and low fuel consumption.

According to the fifth aspect, the covering rate increases from the predetermined engine output towards the maximum efficiency output when the basic engine target output is equal to or larger than the predetermined engine output and smaller than the maximum efficiency output, and therefore, the feeling of strangeness with respect to the operation noise of the engine that is felt by the driver can be reduced.

According to the sixth aspect, a further discharge of the battery can be prevented. In addition, even when the engine covers the correction output in whole due to the low state-of-charge of the battery, since the correction output is smaller than the predetermined correction output, the driver is prevented from feeling the feeling of strangeness from the operation noise of the engine. In this way, both of the driveability supported by the increased driving force and low fuel consumption can be improved, without causing the driver to feel the feeling of strangeness.

According to the seventh aspect, a further charge of the battery can be prevented. In addition, when the battery covers the correction output in whole due to the high state-of-charge of the battery, the operation point of the engine does not change, and therefore, both of the driveability supported by the increased driving force and low fuel consumption can be improved, without causing the driver to feel the feeling of strangeness. Additionally, the battery covers the correction output in whole, and therefore, the low fuel consumption can be improved further.

According to the eighth aspect, the discharge of the battery can be suppressed. In addition, when the correction output is larger than the predetermined correction output although the state-of-charge of the battery is low, the correction output is limited to the predetermined correction output, and the battery is caused not to cover the correction output at all. Therefore, both of driveability and low fuel consumption can be improved, while minimizing the feeling of strangeness that is felt by the driver.

The invention claimed is:

1. A control unit for a hybrid vehicle, the hybrid vehicle including:
   an engine;
   a generator which generates electric power by being driven by the engine;
   a battery which supplies electric power to an electric motor; and
   the electric motor which is connected to a drive shaft of the hybrid vehicle and which is driven by means of electric power supplied from at least either of the battery and the generator,
   wherein the control unit includes:
   a basic required output calculator for calculating a basic required output for driving the hybrid vehicle based on a driving speed of the hybrid vehicle and an accelerator pedal opening which corresponds to an accelerator pedal operation in the hybrid vehicle;
   a gradient calculator for calculating a rising gradient of a road surface on which the hybrid vehicle runs;
   a correction output calculator for calculating a correction output which is added to the basic required torque based on the rising gradient; and
   a target output calculator for calculating, when a required output which results from adding the correction output to the basic required output is larger than a predetermined value, based on the required output, a battery target electric power by which the battery is required to output part of the required output and an engine target output by which the engine is required to output the remaining of the required output.

2. The control unit of claim 1,
   wherein the target output calculator has:
   a basic battery target electric power calculator for calculating a basic battery target electric power for the battery based on the basic required output;
   a basic engine target output calculator for calculating a basic engine target output for the engine; and
   a correction value calculator for calculating a battery target electric power correction value which is added to the basic battery target electric power and an engine target output correction value which is added to the basic engine target output,
   wherein the battery target electric power is calculated by adding the battery target electric power correction value to the basic battery target electric power, and
   wherein the engine target output is calculated by adding the engine target output correction value to the basic engine target output.

3. The control unit of claim 2,
   wherein the correction value calculator has a covering rate setting module for setting a covering rate of the correction output by the battery based on the basic engine target output, calculates the battery target electric power correction value based on the correction output and the covering rate, and calculates the engine target output correction value based on the correction output and the battery target electric power correction value.

4. The control unit of claim 3,
   wherein the engine is driven so as to trace a high efficient fuel consumption line, and
   wherein the covering rate setting module sets the covering rate of the correction output by the battery so that the basic engine target output becomes smaller when the basic engine target output is smaller than a predetermined engine output which is smaller than a maximum efficiency output at which the engine operates with a maximum efficiency than when the basic engine target output is the maximum efficiency output or larger.

5. The control unit of claim 4,
   wherein the covering rate setting module sets the covering rate of the correction output by the battery so that the basic engine target output increases from the predetermined engine output towards the maximum efficiency output when the engine target output is equal to or larger than the predetermined engine output and smaller than the maximum efficiency output.

6. The control unit of claim 3, further including:
   a state-of-charge obtaining module for obtaining a state-of-charge of the battery,
   wherein, when the state-of-charge is a predetermined value or smaller and the correction output is smaller than a predetermined correction output, the covering rate setting module sets the covering rate of the correction output by the battery so that the battery does not cover the correction output at all.

7. The control unit of claim 3, further including:
   a state-of-charge obtaining module for obtaining a state-of-charge of the battery,
   wherein, when the state-of-charge is a predetermined value or larger, the covering rate setting module sets the covering rate of the correction output by the battery so that the battery covers the correction output in whole.

8. The control unit claim 3, further including:
   a state-of-charge obtaining module for obtaining a state-of-charge of the battery,
   wherein, when the state-of-charge is a predetermined value or smaller and the correction output is larger than a predetermined correction output, the correction output calculator limits the correction output to the predetermined correction output, and
   wherein the covering rate setting module sets the covering rate of the correction output by the battery so that the battery does not cover the correction output at all.

9. The control unit of claim 7,
   wherein, when the state-of-charge is a predetermined value or larger, the covering rate setting module sets the covering rate of the correction output by the battery so that the battery covers the correction output in whole.

10. The control unit of claim 8,
    wherein, when the state-of-charge is a predetermined value or larger, the covering rate setting module sets the covering rate of the correction output by the battery so that the battery covers the correction output in whole.

* * * * *